(12) United States Patent
Suhir

(10) Patent No.: US 6,337,932 B1
(45) Date of Patent: Jan. 8, 2002

(54) APPARATUS AND METHOD FOR THERMOSTATIC COMPENSATION OF TEMPERATURE SENSITIVE DEVICES

(75) Inventor: Ephraim Suhir, Randolph, NJ (US)

(73) Assignee: Agere Systems Guardian Corp., Allentown, PA (US)

( * ) Notice: Subject to any disclaimer, the term of this patent is extended or adjusted under 35 U.S.C. 154(b) by 0 days.

(21) Appl. No.: 09/392,377

(22) Filed: Sep. 9, 1999

(51) Int. Cl.[7] ................................................. G02B 6/00
(52) U.S. Cl. ....................................................... 385/13
(58) Field of Search .............................. 385/13, 24, 27, 385/28; 359/124, 127, 130, 820

(56) References Cited

U.S. PATENT DOCUMENTS

| | | | | |
|---|---|---|---|---|
| 3,582,856 A | * | 6/1971 | Watrous et al. | 337/382 |
| 4,134,540 A | * | 1/1979 | Lagher | 236/34.5 |
| 4,287,495 A | * | 9/1981 | Lund, Jr. et al. | 333/239 |
| 5,095,632 A | * | 3/1992 | Hassler, Jr. et al. | 33/493 |
| 5,196,694 A | * | 3/1993 | Berthold et al. | 250/227 |
| 5,416,867 A | * | 5/1995 | Throsten et al. | 385/73 |
| 5,523,893 A | * | 6/1996 | Haas | 359/820 |
| 5,557,474 A | * | 9/1996 | McCrary | 359/820 |
| 5,694,503 A | * | 12/1997 | Fleming et al. | 385/37 |
| 5,770,155 A | * | 6/1998 | Dunphy et al. | 422/82.05 |
| 5,987,200 A | * | 11/1999 | Fleming et al. | 385/37 |
| 6,044,189 A | * | 3/2000 | Miller | 385/37 |

* cited by examiner

*Primary Examiner*—Ricky Mack
(74) *Attorney, Agent, or Firm*—Gibbons, Del Deo, Dolan, Griffinger & Vecchione

(57) ABSTRACT

Temperature-sensitive devices are mounted within a thermostatic structure that provides temperature compensation by applying compression or tensional forces to stabilize the performance of the device across a significant operating temperature range. In a preferred embodiment, an optical fiber refractive index grating is thermostatically compensated to minimize changes in the reflection wavelength of the grating.

33 Claims, 2 Drawing Sheets

US 6,337,932 B1

APPARATUS AND METHOD FOR THERMOSTATIC COMPENSATION OF TEMPERATURE SENSITIVE DEVICES

RELATED APPLICATIONS

The present invention is related to U.S. patent application Ser. No. 09/392,378, filed concurrently herewith, entitled METHOD FOR THE DESIGN OF BI-MATERIAL THERMOSTATIC DEVICES, and U.S. patent application Ser. No. 09/392,412, filed concurrently herewith, entitled METHOD FOR THE DESIGN OF BI-MATERIAL THERMOSTATIC DEVICES WITH MINIMAL INTERFACIAL PEELING STRESS, which are assigned to the same assignee and are incorporated by reference herein.

FIELD OF THE INVENTION

This invention pertains to temperature compensation devices and methods and particularly to temperature compensation for optical devices.

BACKGROUND OF THE INVENTION

The performance of many devices is sensitive to changes in size of the device or a constituent part. However, with many materials, changes of temperature generally cause the material to change in size because the material has a non-zero Coefficient of Thermal Expansion (CTE). The CTE is a measure of the change in size of a material as a function of temperature and is defined, in English units, as the change in "inches per inch per degree Fahrenheit." One such device where performance is effected by temperature is a simple scale. The accuracy of the scale depends on fixed spacing of the regular marks over an operating temperature.

Various methods and devices are known in the art to compensate for temperature induced thermal expansion. For example, U.S. Pat. No. 5,095,632, "Composite Structure Unidirectionally Stable With Respect to Thermal and Moisture Expansion," discloses the use of multiple materials with different CTE's for thermal compensation in a scale. Other known thermal compensation methods are applicable to devices that operate by the action of electromagnetic wave phenomena and which may also be very sensitive to thermal expansion and contraction. U.S. Pat. No. 4,287,495, "Thermally Compensated Phase-Stable Waveguide," discloses the use of materials with differing and compensating CTE's to control the size, and thus the phase properties, of a waveguide for radio-frequency or microwave radiation. A device for coupling two optical waveguides with temperature compensation is shown in U.S. Patent No. 5,416,867, "Passive Temperature-Compensated Optical Waveguide Coupler." Methods of precisely maintaining the position of optical lenses over a significant temperature range are disclosed in U.S. Pat. No. 5,523,893, "Strain-Free Temperature Compensated Optical Mounts," and in U.S. Pat. No. 5,557,474, "Passive Thermal Compensation Method and Apparatus."

SUMMARY OF THE INVENTION

In one aspect of the invention, a method and an apparatus are disclosed for mounting a temperature-sensitive device to a bi-material thermostatic structure in such a manner that the thermostatic structure changes its curvature in a complementary response to temperature-induced size changes of a temperature sensitive device. The bi-material thermostatic structure applies a force in opposition to the temperature induced change of the temperature-sensitive device. In a second aspect, and a preferred embodiment of the invention, the method of the invention is applied to thermal compensation of optical fiber refractive index gratings, which are used as components in wave division multiplexed (WDM) fiber optic communications systems.

BRIEF DESCRIPTION OF THE FIGURES

The advantages, nature and various additional features of the invention will appear more fully upon consideration of the illustrative embodiments to be described in detail in connection with the accompanying drawings. In the drawings.

It is to be understood that these drawings are for purposes of illustrating the concepts of the invention and are not to scale.

DETAILED DESCRIPTION OF THE INVENTION

The invention disclosed herein uses a bi-material thermostatic member to compensate for temperature-dependent changes in the size of a temperature sensitive device by applying a compensating force to oppose thermally induced dimensional changes. There are many applications where this method may be applied. For example, the pitch of a string on a musical instrument can be controlled by maintaining string tension despite temperature-dependent lengthening or shortening of the string. In a second example, the maximum pressure allowed by a release valve, such as may be found on common water heaters, can be controlled by mounting one side of the valve in juxtaposition with the thermostatic structure disclosed herein. In a preferred embodiment, a thermostatic structure, according to the invention, can provide a compensating adjustment in a length of optical fiber substantially equal, and opposite, to the temperature induced change in the length of the fiber. A particularly beneficial use of such an application is found in the stabilization of optical fiber refractive index gratings (referred to herein as "gratings"). One common use of such gratings is to reflect a specific narrow-band wavelength for separation of wavelengths in WDM fiber optic communication systems. Because the period ($\Lambda$) of an optical fiber refractive index grating is subject to change with changes in length of the optical fiber, undesired temperature induced changes in the optical fiber, and the grating, adversely influence the separation of wavelengths and the subsequent performance of WDM systems. Application of the thermostatic structure of the invention to compensate for temperature induced changes in the optical fiber operates to stabilize the grating period and the subsequent performance of the grating.

Figure 1:
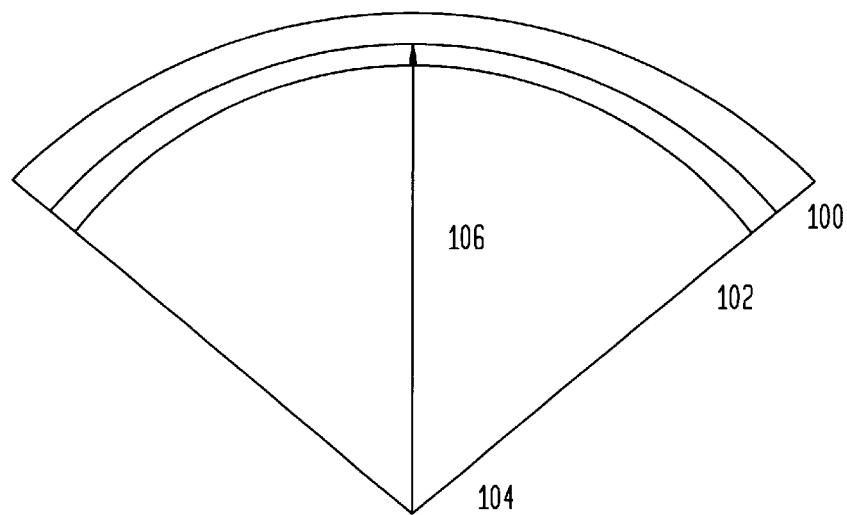
FIG. 1 is a cross-sectional view of an exemplary embodiment of a bi-material thermostatic element.

While it is known in the art to provide temperature compensation for a fiber optic refractive index grating—e.g., U.S. Pat. No. 5,694,503, the structure and method of the invention provides an improved alternative to such prior art techniques. That structure and method are described hereafter in conjunction with FIGS. 1–5. FIG. 1 illustrates a cross-section of a common thermostatic device in which the device is formed as a beam having two layers of different materials, 100 and 102. For the device of FIG. 1, the CTE of material 100 is greater than the CTE of material 102. In a normal operating temperature range the bi-material thermostatic beam is curved with a radius 106 about center point 104 and is represented by the curvature κ, which is the inverse of the radius 106. As shown in the cross-referenced co-pending applications Ser. No. 09/392,378 and Ser. No. 09/392,412, the theoretical maximum curvature $\kappa_o$ of such a thermostatic beam may be described algebraically as;

$$\kappa_0 = \frac{1}{\rho_o} = K*(\Delta\alpha\Delta t) = K*(\alpha_2 - \alpha_1)\Delta t \qquad \text{[Equation 1]}$$

where $\rho_o$ is the radius of curvature at maximum curvature;
K is a constant;
$\alpha_1$ is the coefficient of thermal expansion of material 100;
$\alpha_2$ is the coefficient of thermal expansion of material 102; and
$\Delta t$ is the change in temperature.

For a given thermostatic device the coefficients of thermal expansion ($\alpha_2$ and $\alpha_1$) are constant values and the difference in the CTEs is also a constant. Thus, in accordance with Equation 1, the curvature of the thermostatic device changes proportionally to changes in temperature. In the illustrated embodiment of the invention, as the CTE of material 100 is greater than the CTE of material 102, the curvature of the thermostatic device increases in response to an increase in temperature. A detailed analysis of the mechanics and temperature responsiveness of such thermostatic devices is found in the inventor's article, Dr. Ephraim Suhir, *Stresses in Bi-Metal Thermostats*, Journal of Applied Mechanics, September, 1986, American Society of Mechanical Engineers, New York, N.Y., pp. 657–660 which is incorporated by reference herein.

Figure 2:
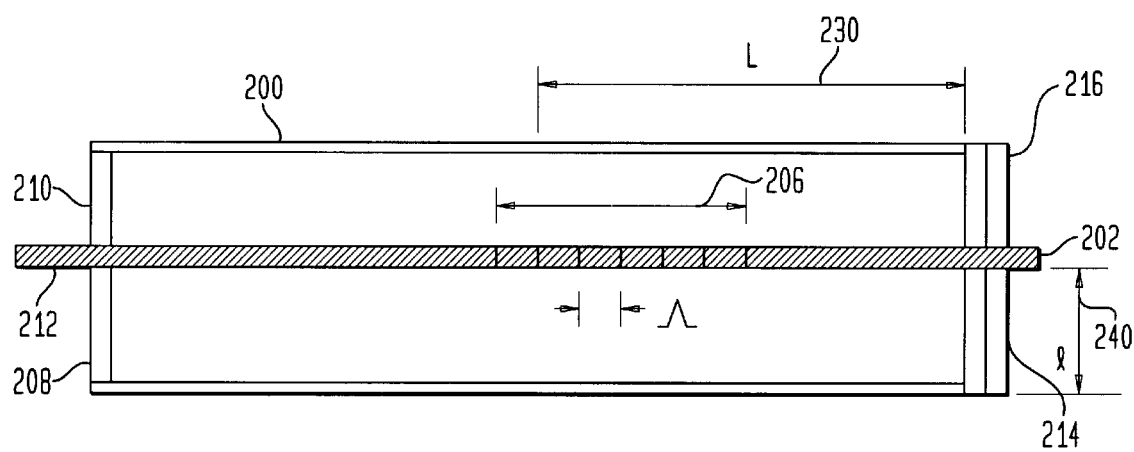
FIG. 2 is a cross-sectional view of an exemplary embodiment of an optical fiber refractive index grating mounted in a temperature compensation thermostatic structure in which thermostatic devices are applied at a single end of the thermostatic structure.

FIG. 2 illustrates a first embodiment of the invention applied to the thermal stabilization of a fiber optic grating. The figure depicts a longitudinal cross-section of an optical fiber 202 containing grating 206 mounted in a rigid enclosure 200. As illustrated, rigid enclosure 200, having a longitudinal portion 220, surrounds a section of fiber 202. An end section 208 is fixedly attached to one end of longitudinal section 220, and the opposite end of longitudinal section 220 remains open. Contained within end section 208 is opening 210. Fiber 202 traverses enclosure 200 by passing through opening 210 in closed end 208 and continues through to the opposing open end. Fiber 202 is fixedly attached to closed end 208. As is illustrated, opening 210 is depicted significantly enlarged to show fiber 202 passing through opening 210 and is not intended to limit the size of opening 210. Fiber 202 is also fixedly attached to the ends of two identical, and oppositely disposed thermostatic devices, 214 and 216, which are also fixedly attached at their opposite ends to enclosure 200. In this exemplary embodiment, the cross sectional shape of enclosure 200 is depicted as tubular; however, this shape is merely descriptive of a shape that can be used for the enclosure and is not intended to limit the shapes that can be employed in the application of the invention. Enclosure forms such as conical, cylindrical, elliptical, oblong, parabolic, and spherical can all be employed without affecting the performance of the invention.

Grating 206, contained within the optical fiber, operates to reflect a specific wavelength, λ. The period (Λ) of the grating 206 is the distance between individual grating lines and is determined by the number of ruled lines per unit distance, typically between 100 and 5000 lines per millimeter. The wavelength, λ, reflected by grating 206 is proportional to the grating period (Λ) and the effective reflective index (n) in accordance with the relationship:

$$\lambda = 2n\Lambda \qquad [2]$$

Where n=Cos $\theta_i$; and $\theta_i$ is the angle of incidence of the light source.

Typically, optical fiber 202, having a positive CTE, increases in length as the temperature increases, which causes the distance between grating lines to also increase and change the period (Λ) of the grating 206. This change in the grating causes a change in the wavelength λ reflected. Thus, an alteration in the performance of the grating 206 in separating wavelengths occurs because of the temperature induced change in the fiber. However, with the embodiment of the invention as illustrated in FIG. 2, the curvature of the thermostatic devices, 214 and 216 also increases with increasing temperature. The increased curvature of the thermostatic elements 214 and 216 applies a force to the fiber 202, at the point of attachment, causing fiber 202 to compress and these compressive forces oppose the thermally induced expansion of fiber 202. The compressed fiber, in turn, causes a decrease in the period (Λ) of the grating 206. With the proper choice of the materials comprising the thermostatic elements, the compression induced decrease in the period (Λ) of the grating can exactly offset the increase in the period due to the thermal extension of the fiber. Thus, the reflected wavelength λ is maintained substantially constant and the performance of the grating 206 remains unaffected by the increase in temperature.

Similarly, as the temperature decreases, fiber 202 decreases in length in response to the decreased temperature and, accordingly, the period (Λ) of the grating 206 decreases, causing a change in the reflected wavelength and a corresponding alteration in the performance of the grating. However, in the embodiment of the invention illustrated in FIG. 2, the curvature of thermostatic elements 214 and 216 also decreases with the decreased temperature. As the curvature of thermostatic elements 214 and 216 decreases, a tensional force is applied to fiber 202 at the point of attachment. These tension induced forces oppose the contraction of fiber 202 and cause the fiber to lengthen. The tension lengthened fiber 202, in turn, causes an increase in the period (Λ) of the grating 206 that offsets the thermal contraction of the fiber. Thus, the performance of the grating remains unaffected by the decrease in temperature.

Thermostatic elements having sufficient curvature to carry out the objectives of the invention within an expected temperature range can be implemented with properly chosen bi-material elements sized in the order of millimeters. Methods for the sizing of bi-material thermostatic elements are taught in cross-referenced co-pending applications, Ser. No. 09/392,378 entitled, "Method for the Design of Bi-Material Thermostatic Devices" and Ser. No. 09/392,412 entitled, "Method for the Design of Bi-Material Thermostatic Devices with Minimal Interfacial Peeling Stress."

As explained in detail in the cross-referenced co-pending applications, sizing of a bi-material thermostatic devices may be determined using the following relationship of the component materials:

$$E_1{}^* h_1{}^2 = E_2{}^* h_2{}^2 \qquad [3]$$

$$\text{where } E_1^* = \frac{E_1}{1-v_1^2} \text{ and } E_2^* = \frac{E_2}{1-v_2^2} \qquad [4]$$

are the generalized Young's moduli of materials 100 and 102 respectively;

$h_1$ and $_2$ are the thickness of materials 100 and 102, respectively;

$E_1$ and $E_2$ are the Young's modulus of materials 100 and 102, respectively; and $v_1$ and $v_2$, are the Poisson's ratio of materials 100 and 102.

To compensate for the thermally induced change in the grating period caused by the increased fiber length, thermostatic devices 214 and 216 must deflect sufficiently to account for changes in the length of both the enclosure and the fiber to restore the fiber to its initial length. The linear change in the enclosure and fiber may be determined as:

$$\Delta L = (\alpha_s + \alpha_e) L \Delta t \qquad [5]$$

where $\alpha_s$ is the CTE of the glass fiber;

$\alpha_e$ is the CTE of the surrounding enclosure;

L is one half the length of the enclosure; and $\Delta t$ is the change in temperature.

The condition of zero temperature-induced displacement of the enclosed glass fiber is achieved when the change in linear dimension is totally compensated by the deflection of the thermostatic device at the thermostatic-device end. This may be expressed algebraically as:

$$\Delta L = w(x)_{/x=l} \qquad [6]$$

where w(x) is the deflection function of a bi-material thermostatic device, and, as explained in the cross-referenced co-pending application, is expressed as:

$$w(x) = w_{max} \frac{x^2}{l^2} \qquad [7]$$

where l is one-half the length of the thermostatic element; and $w_{max}$ is the maximum deflection of the thermostatic device, and is expressed as:

$$w_{max} = 3 \frac{\Delta \alpha \Delta t}{h} l^2 \qquad [8]$$

where $\Delta \alpha$ is the difference in CTE of the two materials $\Delta t$ is the change in temperature; and $$h = h_1 + h_2 \qquad [9]$$

is the thickness of the bi-material device.

Now, substituting Equation 5 and 7 into Equation 6, the thickness of the bi-material thermostatic device that the compensates of the change in length of the enclosure and fiber can be determined as:

$$h = 3 \frac{\Delta \alpha}{\alpha_s + \alpha_e} \frac{l^2}{L} \qquad [10]$$

Further, substituting Equation 9 into Equation 3, the relationship between the generalized Young moduli of the materials selected and the thickness of the materials can be expressed algebraically as:

$$(E_1{}^* + E_2{}^*) h_1{}^2 + 2 E_2{}^* h_{h1} - E_2{}^* h^2 = 0 \qquad [11]$$

Solving Equation 11 as a quadratic equation in $h_1$, the thickness of the first material necessary to achieve sufficient deflection, w(x), at bi-material thermostatic-device end (x=l) to compensate for the temperature induced change in length of enclosure and fiber can be determined as:

$$h_l = \frac{h}{\eta} (\sqrt{1+\eta} - 1) \qquad [12]$$

$$\text{where } \eta = 1 + \frac{E_1^*}{E_2^*} \qquad [13]$$

and $$h_2 = h - h_1 \qquad [14]$$

Thus, thermostatic devices sized in accordance with method of the invention, expressed in Equations 12, 13 and 14, totally compensate for temperature induced changes in enclosure and fiber.

As an example, the sizing of a bi-material thermostatic device capable of compensating for thermal induced changes is described in relation to the exemplary structure illustrated in FIG. 2. In this example, bi-material thermostatic devices 214 and 216 are designed to compensate for thermal induced expansion of fiber 202 and surrounding enclosure 200 through an operational temperature change of 100° C.

In this example, consider that enclosure 200 is made from a material, such as Kovar which has a CTE of $5.0 \times 10^{-6}$ m/° C., and optic fiber 202, made of silicon, has a CTE of $0.5 \times 10^{-6}$ m/° C. Further, assume enclosure 200 in tubular and has a length of 20 millimeters (i.e. 2*L,) and a radius of 4 millimeters (i.e., 1).

In selecting the composite materials of bi-material thermostatic devices 214 and 216, the thermal and elastic properties of the materials are chosen such that the difference in CTE between the two materials (i.e., $\Delta \alpha = \alpha_2 - \alpha_1$) is $5.5 \times 10^{-6}$ m/° C. and their generalized Young's moduli are related as $E_1{}^* = 2 E_2{}^*$. It should be understood that the material properties selected in this exemplary example are chosen solely to illustrate the design of the thermostatic device. The selection of thermal and elastic properties in this manner is not intended to limit the design of the bi-material thermostat devices to these exemplary relations and is presented for illustrative purposes only.

In this exemplary case, the change in length of enclosure 200 and fiber 202, and the deflection compensation necessary to maintain fiber 202 at its original length, can be determined for a 100° temperature change as:

$$\Delta L = (\alpha_s + \alpha_e) L \Delta t$$

$$\Delta L = (0.5 + 5.0) \times 10^{-6} \times (10 \times 10^{-3}) \times (1 \times 10^2) = 5.5 \ \mu m = 5.5 \text{ microns}$$

From Equation 10, the thickness of the bi-material thermostatic device necessary to produce a deflection of the bi-material thermostatic device to compensate for 5.5 microns of dimensional change is determined as:

$$h = 3 \frac{\Delta \alpha}{\alpha_s + \alpha_e} \frac{l^2}{L}$$

$$h = 3 \frac{5.5 \times 10^{-6}}{5.0 \times 10^{-6} + 0.5 \times 10^{-6}} \frac{(4 \times 10^{-3})^2}{10 \times 10^{-3}} = 4.8 \text{ mm}$$

The thickness of the component materials of the bi-material thermostatic devices that produce the necessary deflection are determined as:

$$\eta = 1 + \frac{E_1^*}{E_2^*} = 3$$

$$h_1 = \frac{h}{3}(\sqrt{1+3} - 1) = \frac{h}{3} = 1.6 \text{ mm; and}$$

$$h_2 = h - h_1 = 3.2 \text{ mm}$$

Thus, a bi-material thermostatic device having a thickness of 4.8 mm, with elements of thickness of 1.6 and 3.2 mm, respectively, is able to compensate for the temperature induced increase in the fiber optic cable by deflecting, in this example, a total of 5.5 microns; five microns for the expansion of enclosure 200 and 0.5 microns to account for fiber 202. The additional 0.5 microns of deflection maintains fiber 202 at it original, unextended length; thus, the period of the grating remains at its original spacing even though enclosure 200 has increased in length.

Table 1 shows the deflection of this exemplary thermostatic device designed according to the method of the invention for various changes in temperature. It should be understood that the temperatures shown are only illustrative examples and are only intended to illustrate the methodology of the invention These illustrated values are not intended to limit the scope of the invention to specific temperatures or temperature range, or to limit the design of bi-material temperature compensation devices to that illustrated in FIG. 2.

As can be seen in Table 1, the thermally induced expansion of enclosure 200 and fiber 202, and the compensating deflection of the bi-material thermostatic device, change linearly with changes in temperature. Thus, the deflection of the thermostatic device compensates totally for any thermal induced change in fiber 202, and accordingly, the period of the grating remains substantially constant over the operational temperature range.

TABLE 1

Bi-Material Thermostatic Deflection.

| Change in Temperature $\Delta t$ (° C.) | Enclosure Expansion (microns) | Fiber Expansion (microns) | Compensation ($\Delta L$) (microns) | Deflection (w(l)) (microns) |
|---|---|---|---|---|
| 10 | 0.5 | 0.05 | 0.55 | 0.55 |
| 30 | 1.5 | 0.15 | 1.65 | 1.65 |
| 50 | 2.5 | .25 | 2.75 | 2.75 |
| 70 | 3.5 | .35 | 3.85 | 3.85 |
| 90 | 4.5 | .45 | 4.95 | 4.95 |
| 100 | 5.0 | 0.5 | 5.5 | 5.5 |

As a second example of the method of the invention, consider the composite materials of the bi-material thermostatic devices selected having the same thermal properties in the previous example, but the generalized Young's moduli are selected such that $E_1^* = 7 E_2^*$. For the deflection necessary to compensate for the temperature induced change in enclosure 200 and fiber 202 (5.5 microns for a 100° C. change in temperature) the bi-material thermostat material thickness remains 4.8 mm, however, the thichkness of the two materials is altered as:

$$\eta = 1 + \frac{E_1^*}{E_2^*} = 8$$

$$h_1 = \frac{h}{8}(\sqrt{1+8} - 1) = \frac{2h}{8} = 1.2 \text{ mm; and}$$

$$h_2 = h - h_1 = 3.6 \text{ mm.}$$

As a third example of the method of the invention, consider the enclosure being changed to a radius of 8 millimeters and the thermal and elastic properties of the composite materials selected as those of the first example (i.e., the difference in CTE $5.5 \times 10^{-6}$ m/° C. and generalized Young's moduli related as $E_1^* = 2 E_2^*$). The thickness of the composite materials can then be determined as:

$$h = 3 \frac{\Delta \alpha}{\alpha_s + \alpha_e} \frac{l^2}{L}$$

$$h = 19.2 \text{ mm; and}$$

$$\eta = 1 + \frac{E_1^*}{E_2^*} = 3$$

$$h_1 = \frac{h}{3}(\sqrt{1+3} - 1) = \frac{h}{3} = 6.4 \text{ mm; and}$$

$$h_2 = h - h_1 = 12.8 \text{ mm}$$

In still another example, consider the enclosure of the first example and the composite materials of bi-material thermostatic devices 214 and 216 are selected such that the difference in CTE is $11.0 \times 10^{-6}$ m/° C. and the generalized Young's moduli are related as $E_1^* = 2 E_2^*$. Again, consider the change in temperature to be 100° C. The change in length, $\Delta L$, remains 5.5 microns, and the thickness of the bi-material thermostatic device is determined as:

$$h = 3 \frac{11.0 \times 10^{-6}}{5.0 \times 10^{-6} + 0.5 10^{-6}} \frac{(4 \times 10^{-3})^2}{10 \times 10^{-3}} = 9.6 \text{ mm}$$

and the thickness of the component materials of the bi-material thermostatic devices 214 and 216 that produce the necessary deflection to compensate for the temperature induced change in length are determined as:

$$h_1 = \frac{h}{8}(\sqrt{1+8} - 1) = \frac{2h}{8} = 2.4 \text{ mm; and}$$

$$h_2 = h - h_2 = 7.2 \text{ mm.}$$

To show that the thermostatic device of this example compensates for the changes in fiber 202 over all temperatures changes, consider, for example, the deflection necessary to compensate for a 10 degree change in temperature. In this case, ΔL, as shown in Table 1, is 0.55 microns and the deflection of the bi-material thermostatic device, of thickness 9.6 mm, for this 10 degree change in temperature is determined as:

$$w_{\max} = 3\frac{(11 \times 10^{-6})(0.1 \times 10^2)(4 \times 10^{-3})^2}{9.6 \times 10^{-3}} = 0.55 \text{ microns}$$

In another embodiment of the invention, the thermostatic elements corresponding to 214 and 216 of FIG. 2 may be incorporated in a dome-shaped thermostat device that is attached to rigid enclosure 200, and which that provides a cover over the opening in enclosure 200. In this embodiment, the thermostatic elements may be uniformly distributed throughout the dome shape or established as discrete segments within that shape. In either case, the incorporated thermostatic elements function so as to cause the dome to curve in accordance with the changes in temperature. Similar to the embodiment illustrated in FIG. 2, fiber 202 is attached securely to, and passes through, an opening in the crown of the dome shape.

Figure 3:
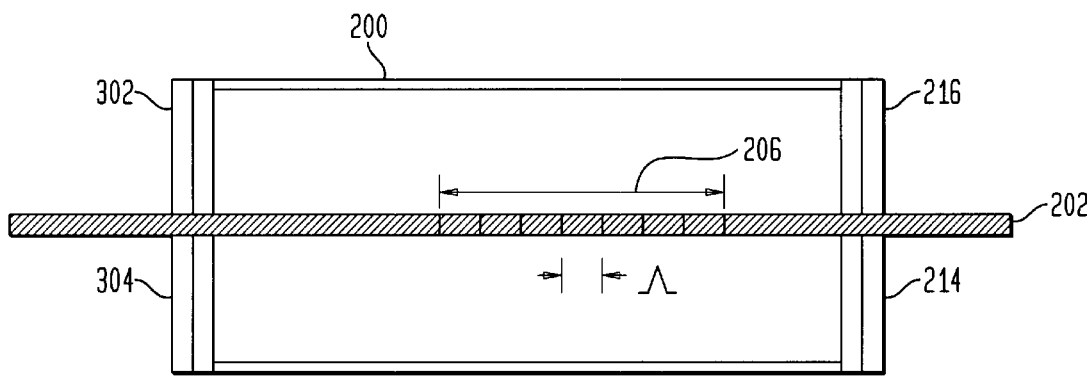
FIG. 3 is a cross-sectional view of an exemplary embodiment of an optical fiber refractive index grating mounted in a temperature compensation thermostatic structure in which thermostatic devices are applied at two ends of the thermostatic structure.

In still another embodiment, thermostatic devices may be attached to fiber 202 at two locations—FIG. 3 being an illustrative of such an embodiment. In the illustrated embodiment, thermostatic elements 214 and 216 are attached to fiber 202 at one end of enclosure 200, in an arrangement similar to the embodiment illustrated in FIG. 2, and thermostatic devices 302 and 304 are attached to the fiber 202 at an opposite end of enclosure 200 and in opposing positions to elements 214 and 216. In this embodiment, thermostatic devices 214 and 216 respond to changes in temperature as described in connection with the embodiment illustrated in FIG. 2. Thermostatic elements 302 and 304 also respond to changes in temperature in the same manner as thermostatic elements 214 and 216—i.e., increase curvature in response to increased temperature, and decrease curvature in response to decreased temperature. Thus, in this embodiment each thermostatic element applies compensation forces to the fiber 202 to oppose the dimensional change in fiber 202 caused by a change in temperature. Since this embodiment includes more elements applying compensating force to fiber 202, less compensating force is required of each thermostatic device in opposing any thermal induced dimensional change of fiber 202. As less compensation force is required of each thermostatic device, less change in the curvature of the thermostatic elements 214, 216, 302 and 304 is necessary, and consequently, less contact force is applied by the thermostatic elements 214, 216, 302 and 304 to the fiber at the point of attachment. The application of less force at the points of attachment reduces the potential of crimping, straining or cracking fiber 202.

Figure 4:
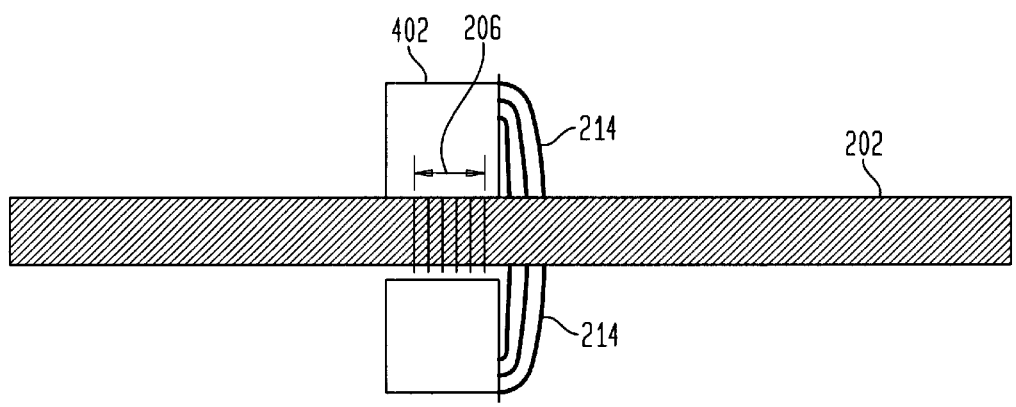
FIG. 4 is a cross-sectional view of an exemplary embodiment of an optical fiber refractive index grating mounted in a temperature compensation thermostatic structure formed by thermostatic devices.
Figure 5:
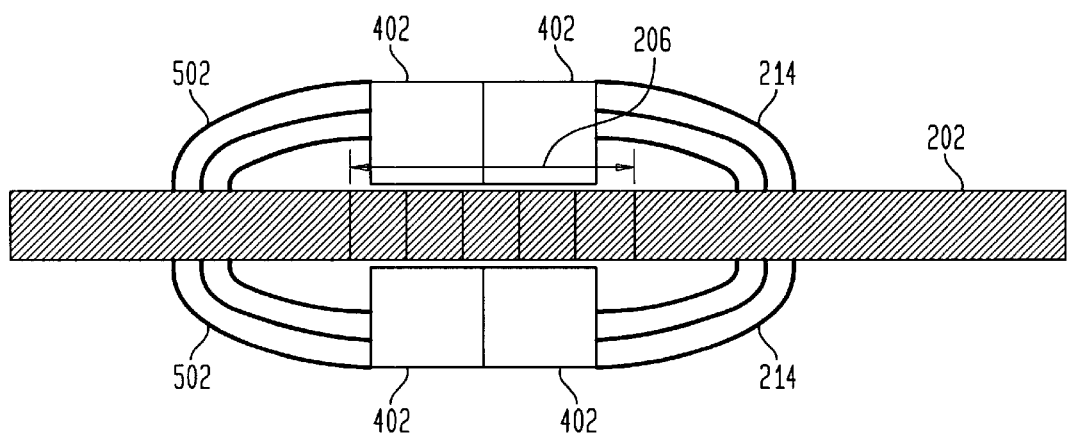
FIG. 5 is a cross-sectional view of an exemplary embodiment of a fiber mounted between thermostatic devices which are joined together to form a temperature compensation thermostatic structure.

In still other embodiments, the thermostatic elements may be configured as depicted in FIGS. 4 or 5. Referring to FIG. 4, a single thermostatic element 214 is attached to flange 402 to construct a thermostatic compensation device. In this embodiment, fiber 202 is fixedly attached to both thermostatic element 214 and to flange 402 and passes through opening 406. The operation of this thermostatic device in opposing dimensional changes in fiber 202 is similar to that operation as explained in detail in conjunction with the embodiment illustrated in FIG. 2.

Illustrated in FIG. 5 are two thermostatic devices, of the same general type as illustrated in FIG. 4, oppositely joined and mounted together. In this embodiment, fiber 202 is attached solely to the thermostatic elements 214 and 502— i.e., the fiber is unconstrained as it passes through the openings 406 in the back-to-back flanges 402. The operation of the thermostatic elements 214 and 502 in opposing the dimensional change of fiber 202 in this embodiment is similar to that described in connection with the embodiment illustrated in FIG. 3.

CONCLUSION

A novel method for the compensation of temperature induced changes has been presented. In a preferred embodiment, the method and apparatus are directed toward compensation of fiber optic cable to remove the effects of temperature-induced changes, on system performance. However, the method and apparatus of the invention may also be applied to temperature-sensitive devices other than optical fiber refractive index gratings. Applications to a musical instrument string and a pressure relief valve were noted above. In general, any temperature-sensitive device, the performance of which may be adjusted by tension or compression, may be mounted on a thermostatic compensation device made according to the method of the invention to compensate for the change of performance with temperature.

Materials suitable for use in fabricating the invention include such materials, as metals, ceramics (including those with negative CTE), glass, Kovar, and Invar, and are presented herein only as illustrative examples. It would be apparent to those skilled in the art to substitute any one material for another and therefore a listing of all possible metal types and alloys is not presented herein. To maximize the curvature of the thermostatic elements, bi-material thermostats which include a ceramic with a negative CTE may also be employed. The use of a ceramic material increases the difference in CTE of the two materials constituting the thermostatic elements and thus provides for greater curvature in response to temperature changes.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the invention and the exclusive use of of all modifications which come within the scope of the appended claims is reserved.

What is claimed is:

1. An apparatus for compensation of thermally-induced dimensional change in a structure, wherein at least a portion of said thermally induced dimensional change acts along an axis of said structure, said apparatus comprising:

thermostatic means operative to apply a force at a point along said axis of said structure and proximate to a boundary of said structure, said force being thereby applied substantially in parallel with said axis;

wherein said applied thermostatic force is substantially equal to and oppositely directed from a force acting within said structure to effect said thermally-induced dimensional change.

2. The apparatus of claim 1 wherein said thermostatic means includes:
 a thermostatic device having a first portion attached to said structure at a point along said axis and proximate to a first boundary, and a second portion attached to a reference structure; and
 a reference structure attached to said structure at a point along said axis and proximate to a second boundary, and attached to said second portion of said thermostatic device, said reference structure being operative to maintain a substantially constant displacement between said point of attachment thereof to said structure and said point of attachment to said second portion of said thermostatic device.

3. The apparatus of claim 1 wherein said thermostatic means includes:
 a first thermostatic device having a first portion attached to said structure at a point along said axis and proximate to a first boundary, and a second portion attached to a reference structure; and
 a second thermostatic device having a first portion attached to said structure at a point along said axis and proximate to a second boundary, and a second portion attached to said reference structure;
 wherein attachment point for said second portion of said first thermostatic device at said reference structure and said attachment point for said second portion of said second thermostatic device at said reference structure are displaced from one another by a substantially constant distance.

4. An apparatus as recited in claim 1, wherein said structure is an optical fiber.

5. An apparatus as recited in claim 4, wherein said optical fiber is characterized by a known refractive gradient index.

6. An apparatus as recited in claim 2, wherein said thermostatic device includes at least one bi-material thermostat.

7. An apparatus as recited in claim 3, wherein said first thermostatic device and said second thermostatic device include at least one bi-material thermostats.

8. A method for compensation of thermally-induced dimensional change in a structure, wherein at least a portion of said thermally induced dimensional change acts along an axis of said structure, said method comprising the step of:
 applying a force at a point along said axis of said structure, said force being thereby applied substantially in parallel with said axis and being substantially equal to and oppositely directed from a force acting within said structure to effect said thermally-induced dimensional change.

9. The method according to claim 8 wherein said structure is an optical fiber.

10. The method according to claim 9 wherein said optical fiber is characterized by a known refractive gradient index.

11. The method according to claim 8 wherein said force is produced by at least one bi-material thermostatic device.

12. An apparatus to compensate for temperature induced dimensional changes in a temperature sensitive device at least partially enclosed within said apparatus, comprising:
 an enclosure having a first end and a second end, said first end having an opening, said temperature sensitive device being fixedly attached to said first end at said opening; and
 a thermostatic structure fixedly attached to said enclosure second end and fixedly attached to said temperature sensitive device at a point proximate to said second end, said thermostatic structure operating to oppose temperature induced dimensional changes in said temperature sensitive device.

13. An apparatus as recited in claim 12, wherein said thermostatic structure is comprised of:
 a dome shape having a base and a crown; said base being fixedly attached to said enclosure second end and said crown being fixedly attached to said temperature sensitive device, said dome shape including at least one bi-material thermostatic device.

14. An apparatus as recited in claim 12, wherein said thermostatic structure is comprised of:
 at least one bi-material thermostatic device, each thermostatic device having a first end and a second end, said thermostatic device first end being fixedly attached to said enclosure second end and thermostatic device second end being fixedly attached to said temperature sensitive device at a point proximate to said second end.

15. An apparatus as recited in claim 12, wherein said temperature sensitive device is an optical fiber.

16. An apparatus as recited in claim 15, wherein said optical fiber is characterized by a known refractive gradient index.

17. An apparatus as recited in claim 12, wherein said thermostatic structure includes at least one bi-material thermostatic device.

18. An apparatus to compensate for temperature induced dimensional changes in a temperature sensitive device traversing said enclosure comprising:
 an enclosure having a first end and a second end; and
 a first thermostatic structure and a second thermostatic structure, said first thermostatic structure being fixedly attached to said enclosure first end and fixedly attached to said temperature sensitive device at a point proximate to said first end, said second thermostatic structure being fixedly attached to said enclosure second end and fixedly attached to said temperature sensitive device at a point proximate to said second end.

19. An apparatus as recited in claim 18, wherein said thermostatic structure is comprised of:
 a dome shape having a base and a crown; said base being fixedly attached to said enclosure end and said crown being fixedly attached to said temperature sensitive device, said dome shape including at least one bi-material thermostatic device.

20. An apparatus as recited in claim 18, wherein said thermostatic structure is comprised of:
 at least one thermostatic device, each said thermostatic devices having a first end and a second end, wherein said thermostatic device first end being fixedly attached to said enclosure end and said thermostatic device second end being fixedly attached to said temperature sensitive device at a point proximate to said enclosure end.

21. An apparatus as recited in claim 18, wherein said temperature sensitive device is an optical fiber.

22. An apparatus as recited in claim 21, wherein said optical fiber is characterized by a known refractive gradient index.

23. An apparatus as recited in claim 18, wherein said thermostatic structure includes at least one bi-material thermostatic device.

24. An apparatus to compensate for temperature induced dimensional changes in a temperature sensitive device traversing said apparatus comprising:

a thermostatic structure fixedly attached to said temperature sensitive device at two points; said thermostatic structure operating to oppose temperature induced dimensional changes in said temperature sensitive device.

25. An apparatus as recited in claim 24, wherein said thermostatic structure is comprised of:

a dome shape having a base and a crown; said base being fixedly attached to said enclosure second end and said crown being fixedly attached to said temperature sensitive device, said dome shape including at least one thermostatic device.

26. An apparatus as recited in claim 24, wherein said thermostatic structure is comprised of:

at least one thermostatic device, each said thermostatic device having a first end and a second end, wherein said thermostatic device first end is fixedly attached to said temperature sensitive device and said thermostatic device second end is fixedly attached to said temperature sensitive device.

27. An apparatus as recited in claim 24, wherein said temperature sensitive device is an optical fiber.

28. An apparatus as recited in claim 27, wherein said optical fiber is characterized by a known refractive gradient index.

29. An apparatus as recited in claim 26, wherein said thermostatic device includes at least one bi-material thermostat.

30. A method to compensate for temperature induced dimensional change in a temperature sensitive device, comprising the step of:

rigidly attaching a temperature sensitive device at two points; at least one of said two points being attached to a thermostatic device, wherein said thermostatic device operates to apply a force opposing dimensional change in said temperature sensitive device caused by temperature change.

31. The method according to claim 30 wherein said thermostatic device includes at least one bi-material thermostat.

32. The method according claim 30 wherein said temperature sensitive device is an optical fiber.

33. The method according claim 32 wherein said optical fiber is characterized by a known refractive gradient index.

\* \* \* \* \*